United States Patent [19]

Blom

[11] 4,119,214
[45] Oct. 10, 1978

[54] METHOD AND DEVICE FOR LOADING STOCK INTO A MACHINE

[75] Inventor: Rolland D. Blom, Providence, R.I.

[73] Assignee: Electric Terminal Corporation, Warwick, R.I.

[21] Appl. No.: 787,015

[22] Filed: Apr. 13, 1977

[51] Int. Cl.² ............................................. B65G 7/08
[52] U.S. Cl. .................................. 214/1 BD; 83/649; 214/1 QE; 214/130 C; 214/152
[58] Field of Search ............. 214/1 BD, 1 QE, 130 C, 214/152, 1 Q; 83/649

[56] References Cited

U.S. PATENT DOCUMENTS

| 3,763,990 | 10/1973 | Ouska | 214/1 Q X |
| 4,067,451 | 1/1978 | Winters | 214/130 C X |

FOREIGN PATENT DOCUMENTS 668,797  3/1952  United Kingdom ................. 214/1 SW Primary Examiner—Albert J. Makay
Assistant Examiner—George F. Abraham
Attorney, Agent, or Firm—Barlow & Barlow

[57] ABSTRACT

A method for loading stock including a device having a base which will fit beneath the pan which receives the stock to be operated upon by a machine and has a stock carrier resting upon the floor and pivoted to this base at a height approximately that of the stock pan and which is also provided with hooks to engage the stock pan so that the carrier may swing about its pivot to rest the stock upon the pan of the machine to receive it and may be easily slid onto the pan for loading the machine for work on the stock.

7 Claims, 5 Drawing Figures

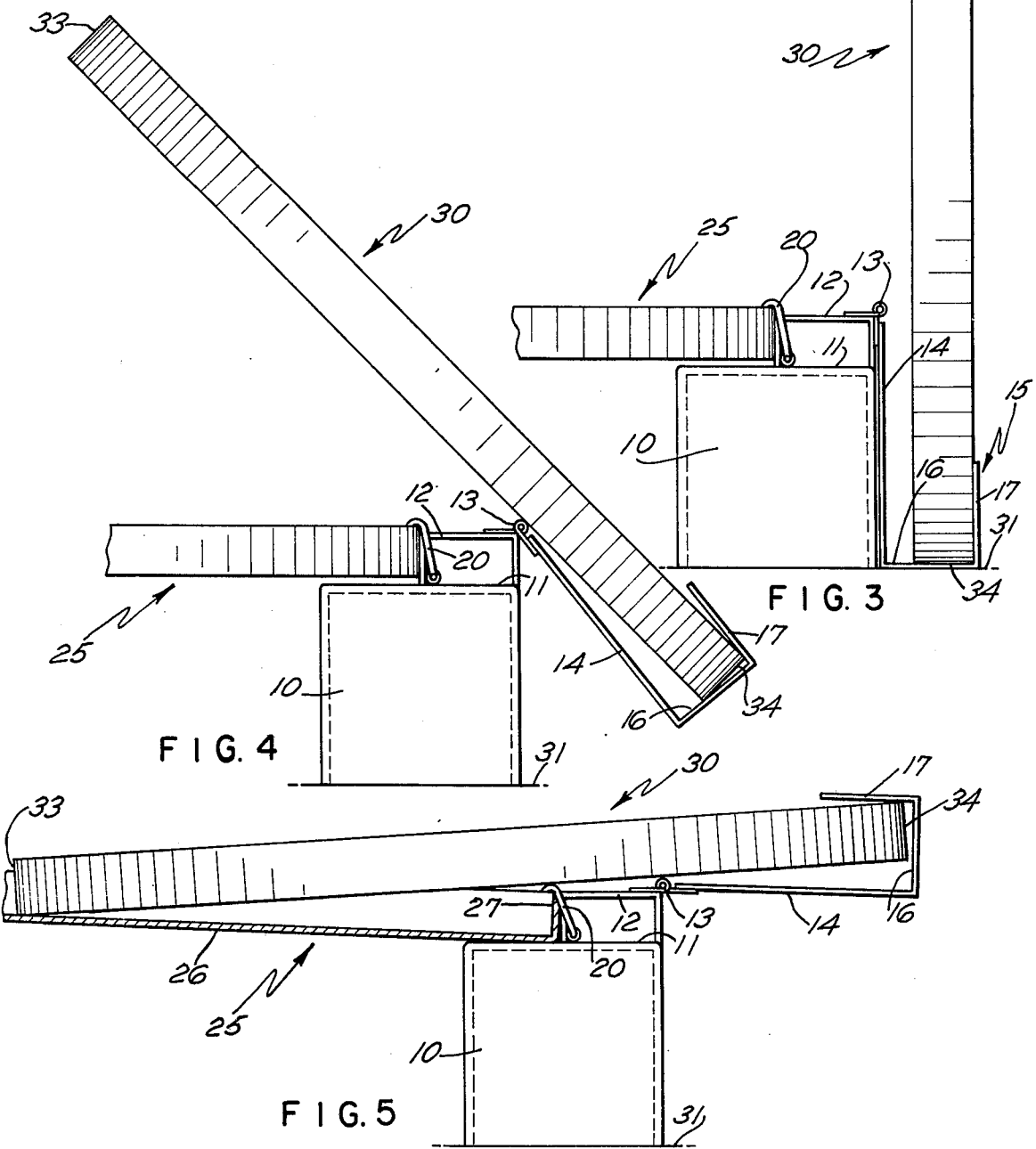

METHOD AND DEVICE FOR LOADING STOCK INTO A MACHINE

BACKGROUND OF THE INVENTION

Machines, such as power presses that operate upon flat metal stock, usually are provided with feed pans for holding the metal stock. The feed pans are generally circular and are supported by a single center bearing that positions the pan above the floor level upon which the machine is mounted. The stock is received in rolls which weigh more than a man should attempt to handle and something in the order of 200 to 250 pounds and result in back strains and the like from a man trying to lift the same bodily onto the pan of the machine.

SUMMARY OF THE INVENTION

The machine to work upon the coil strip of stock usually has a circular pan with an upstanding flange or edge and is supported at its center in a manner so that the pan may rotate about this support as a center. To load this pan which is above the floor, there is provided a rectangular base which will rest on the floor and fit beneath the pan at least to a partial extent for support and which may be hooked to the pan so as not to move relative to the pan while loading occurs. A stock carrier is located along one side of the base on the side away from the pan and rests upon the floor so that a helical coil of stock may be rolled along the floor and into the carrier and when so loaded a man can tilt the carrier about its pivot at a location adjacent the horizontal level of the pan so as to control the same with his foot and one hand as pivoting of the carrier ocurs until the stock rests upon the edge of the pan. With the stock so poised, it may be tilted about the edge of the pan and at the same time slid inwardly until its top edge engages the bottom of the pan and then slid further until it is placed on the horizontal bottom of the pan in the desired location.

DESCRIPTION OF THE DRAWINGS

FIG. 1 is a side elevation of the device;

FIG. 2 is an elevational view of the device looking at the same from the righthand side of FIG. 1;

FIG. 3 is an elevational view of the device with the stock to be loaded shown in the carrier and showing fragmentally a portion of the pan into which the stock is to be placed;

FIG. 4 is a view similar to FIG. 3 but showing the carriage and stock tilted toward the pan;

FIG. 5 is also a similar elevational view of the device but showing the stock further tilted and resting upon the upstanding edge of the pan.

DESCRIPTION OF THE PREFERRED EMBODIMENT

FIG. 1, 10 designates a base which is of generally rectangular box shape having four side walls and a top portion 11 with a raised step as shown at 12. The base rests on a floor 31 and on the upper edge of the stepped portion, there is a hinge 13 which supports arm 14 of the stock carriage designated generally 15 having a bottom wall 16 with an upstanding flange 17. The arm 14 is of a length so that bottom 16 rests on floor 31. Two hooks 20 are pivoted on a common shaft 21 which extends widthwise of the base with hooks on either side of the base.

In FIGS. 3, 4 and 5 I have shown a stock pan designated generally 25 upon which the stock is to be loaded which in FIG. 5 is partly in section and has a circular bottom wall 26 with an upstanding flange 27 extending about the bottom wall 26. This pan is spaced from the floor 31 so that the base 10 will slide under it, the base being of a height a little less than the spacing of the pan from the floor. The stock to be loaded is designated generally 30 as shown in FIGS. 3, 4 and 5 and is a spiral coil of flat sheet matal stock which is bound together in a suitable manner for transporting. This coil stock is generally round and may be rolled over the floor 31 and upon which floor the base 10 rests. The carrier 15, in the position shown in FIG. 3, rests upon the floor 31 and the stock is rolled onto the bottom 16 of the carrier and is then in a position to be tilted about hinge 13 for loading the stock into the pan 25.

The base, of course, is hooked to the pan as shown in FIG. 3 to hold these parts in fixed relation, and the operator has one hand at the top edge 33 of the stock and with his foot against the upstanding flange or portion 17 of the carrier. The operator can tilt the stock and the carrier toward the pan 25 as shown in FIG. 4, and with one hand at the top edge 33 and his foot on the flange 17, he has good control of the stock. After initial tilting the center of gravity of the stock will be well above the pivotal axis of the hinge 13 as can be seen in FIG. 4 and the operator will then control the lowering of the stock manually with his foot against the flange 17 until the stock engages the edge of flange 27 of the pan (FIG. 5). At this point the base 10 supports the pan which is loaded off center of the pan and tilts from its center support as weight is put in it and then with the edge of the flange 27 acting as a fulcrum the stock may be lowered further until its heretofore top portion 33 distant from the diametrically opposite portion 34 engages the bottom of the pan. With the stock supported on the edge of the flange 27 and on the bottom of the pan, the stock 30 may be slid along these two points until it is located in the center of the pan from which location the binding straps will be loosened and the stock fed into the machine which is to operate upon it, all without lifting bodily the stock to be loaded.

As the stock is moved into position, the stock moves from engagement of the flange 17 as seen in FIG. 5 and the carrier by its own weight drops back into the position shown in FIG. 3.

I claim:

1. In combination with a stock feed pan having a stock receiving surface supported above a floor surface, a device for loading stock comprising a base supported on said floor and having a top surface with a raised portion at one end, a stock carrier having a substantially U-shaped lower portion normally resting upon the floor which supports said base so that stock for the feed pan can be rolled thereon, means to pivotally mount said carrier at its upper edge on the raised portion of said base at substantially the level of the upper edge of the stock feed pan lying on the top surface of said base opposite said raised position so that when the carrier is swung to a horizontal position the stock may be slid on said pivotal mount into the feed pan.

2. A device as in claim 1 wherein there are means to releasably attach the stock feed pan to the base.

3. A device as in claim 2 wherein the attaching means comprise a hood pivoted on said base.

4. A device as in claim 2 wherein the ataching means comprise two hooks pivoted on said base.

5. A device as in claim 1 wherein the upper portion of the base is of raised stepped formation providing a recess with the stock feed pan lying in said recess and said pivotal means is on the upper portion of the step of said base.

6. The method of loading a coil of stock on to a stock feed pan having an upstanding rim located at a level above the floor level which comprises providing a stock carrier onto which the coil of stock is rolled, swinging the carrier with the stock therein about a pivotal axis substantially at the level of the stock feed pan adjacent the rim and toward the pan until the stock engages the pan rim as a fulcrum and then tilting the coil of stock about the fulcrum away from said pivotal axis to engage the bottom of said pan.

7. The method of claim 6 wherein the coil of stock is slid along the fulcrum and bottom of the pan into desired position in the pan free from said fulcrum.

* * * * *